June 8, 1926.
M. DE WRANGEL
1,587,763
CONTROL DEVICE FOR TALKING MACHINES
Filed May 29, 1925    2 Sheets-Sheet 1
Fig.1
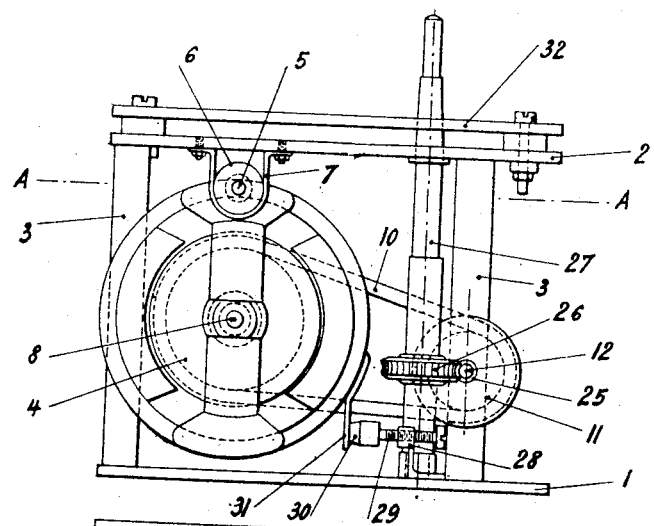
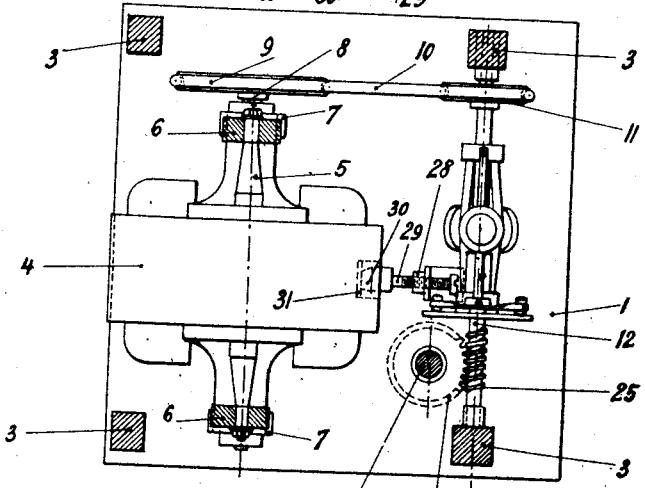
Fig.2
Inventor
M. De Wrangel
by Langner, Parry, Card & Langner
Attys.

June 8, 1926.

M. DE WRANGEL 1,587,763

CONTROL DEVICE FOR TALKING MACHINES

Filed May 29, 1925    2 Sheets-Sheet 2

Inventor
M. De Wrangel
by Langner, Parry, Card & Langner
Attys.

Patented June 8, 1926.

1,587,763

UNITED STATES PATENT OFFICE.

MATHIEU DE WRANGEL, OF PARIS, FRANCE.

CONTROL DEVICE FOR TALKING MACHINES.

Application filed May 29, 1925, Serial No. 33,845, and in France June 4, 1924.

My invention has for its object a control device for a talking machine, allowing the use of a very small electric motor rotating with great speed, thus providing for an absolutely silent device.

Talking machines are now controlled by slow-rotating motors connected with a speed regulator by a gear system between parts of which play soon arises, whereby noise is caused.

On the contrary, in my invention it is possible to use motors with a great speed of rotation and to obtain an absolutely silent control, through making the motor bear on damping supports in a manner such as will prevent the motor from having any metallic contact with the frame.

Moreover, the movement of the motor is transmitted to the turn-table shaft of the talking machine by means of a shaft bearing the regulating device: this device comprises a sleeve sliding on the shaft and cooperating with centrifugal weights. This sleeve bears a disk which comes, when the speed reaches a certain value, against a brake comprising two shoes borne by a U-shaped support and disposed so as to rub against the disk in two opposite points thereof. This arrangement avoids the noise caused by the play of the sleeve on its shaft. Said noise would necessarily arise if the action of the brake were not symmetrical. The position of the brake with reference to the disk can be adjusted according to the speed which is required.

On the other hand a very simple device allows the adjustment of the tension of the belt connecting the motor with the regulator shaft, without causing any two metallic parts to come into contact. Thus the efficiency of the motor is increased and motors of comparatively small power and size can be used.

Finally the frame bearing the motor is borne by a wooden plate which is part of the casing of the talking machine. Damping buffers of rubber, for instance, are interposed between the frame and said wooden plate, so as to absorb any vibrations which might cause noise. In a similar manner noise and vibration dampers are suitably disposed between the mechanical parts so as to make the working completely silent.

A form of execution of the invention is shown by way of example on the appended drawings whereof, Fig. 1 is a side view of the device.

Fig. 2 is a horizontal sectional view, the section being made along the line A—A of Fig. 1.

Figure 3:
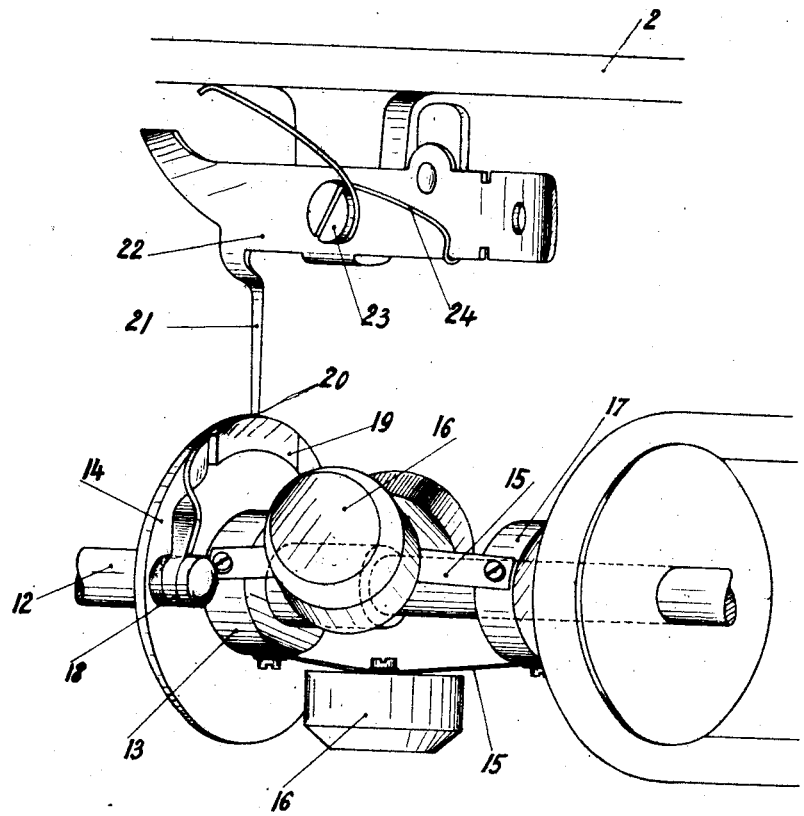
Fig. 3 is a perspective view of the braking system.
Figure 4:
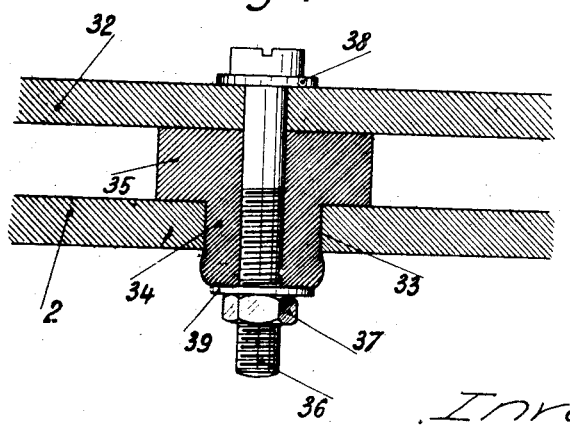
Fig. 4 is a side view, partly sectional showing at a larger scale than Fig. 1 the means whereby the motor frame is secured on its supporting plate.

The whole of the device is borne by a frame comprising a lower plate 1 and an upper plate 2 connected together by the four supports 3. The electric motor 4 is borne at its top part by a shaft 5 which rests on two journals 6 of rubber or any other sound damping material secured to the top plate 2 by the shackles 7.

The shaft 8 of the motor 4 bears a pulley 9 connected by a belt 10 of rubber or any other sound damping material to a pulley 11 borne by the regulator shaft 12 which pivots in the bearings borne by two of the supports 3. A sleeve 13 to one end of which is secured the disk 14 is slidably borne by the shaft 12 (Fig. 3). A number of yielding strips 15 bearing each in their middle a weight 16 are secured by one end to the sleeve 13 and by the other to a collar 17 keyed on to the shaft 12.

The disk 14 can be brought against two brake shoes one of which is shown at 18. These shoes are borne by the U-shaped support 19 and bear against the disk 14 in two diametrically opposed points.

The U-shaped support can pivot in 20 around the extremity of the rod 21 secured to the lever 22. The latter pivots around a threaded spindle 23 secured to plate 2 and one of its arms controls the opening or the closing of an electric contact (not shown) disposed in the feeding circuit of the motor. The lever 22 is kept in its normal position, by an equilibrating spring 24 disposed between the spindle 23 and the lever.

The shaft 12 is provided with a worm 25 engaging a worm wheel 26 keyed on the lower part of the vertical shaft 27 bearing the turn-table.

Through the bearing 28 of said shaft borne by the lower plate 1 a screw 29 is allowed to pass. A damping buffer 30 of rubber, for instance, is provided at the end of said screw and controls a projection 31 secured to the lower part of the motor 4 thus allowing an adjustment of the tension of the belt 10 by making the motor 4 turn round its suspension shaft 5 in a direction contrary to the effort exerted on said motor by the rubber belt 10.

It should be noted that the adjustment of this tension could be obtained also by a pull on the motor opposed to the pull exerted by the belt 12, in which case the pull should be made through a damping part.

The device works in the following manner:

When the motor 4 is actuated it makes the turntable shaft 27 rotate through the belt 10, the shaft 12, the worm 25 and the worm wheel 26. Its great speed is thus reduced in the ratio required for driving the turn-table at a suitable speed. When the speed of the motor increases the sleeve 13 slides on the shaft 12 and at a certain moment comes against the braking shoes such as 18. The braking effort is exerted, because of the disposition of the shoes, in two symmetrical points of the disk 14 and therefore no troublesome noise arises, even if the sleeve shows play with its shaft.

The position of the braking shoes can be adjusted by means of a screw (not shown) acting on the extremity of the lever 22 so as to cause the braking effect to be produced for a well determined speed of the motor.

The motor frame is borne by a wooden plate 32 which is a part of the casing of the talking machine. Damping buffers are interposed between the frame and the wooden plate. In view of this the top plate 2 of the motor frame is provided with a number of holes 33, four for instance, in each of which a plug 34, of rubber for instance, is inserted. The top part 35 of the plug is wider than the lower part and separates the plates 2 and 32. A threaded rod 36 passes through the plug and is provided with a nut 37. A metallic washer 38 is inserted between the head of the threaded rod and the wooden plate 32 and another washer 39 is inserted between the lower part of the plug 34 and the nut 37. By screwing down the nut 37, the plug 34 is compressed whereby it forms a pad over the plate 2 and provides for an excellent elastic securing means. The above described bearing device avoids any contact between two metallic parts and damps all trepidations which might arise.

What I claim is:

1. A noiseless control arrangement for talking machines comprising a high-speed electric motor, a frame, a shaft borne by the top part of said motor and damping supports borne by the frame and bearing the shaft.

2. A noiseless control arrangement for talking machines as claimed in claim 1 comprising a belt driven by the motor, an intermediary shaft controlled by said belt and controlling directly the turntable shaft and a centrifugal regulator borne by the intermediary shaft.

3. A noiseless control arrangement for talking machines as claimed in claim 1 comprising a belt driven by the motor, an intermediary shaft controlled by said belt and controlling directly the turntable shaft, a centrifugal regulator borne by the intermediary shaft, a disk adapted to slide on the intermediary shaft under the action of the regulator, a U shaped support pivotally secured to the frame, and two braking shoes borne by the ends of the said support and disposed in the path of two diametrically opposed points of the disk.

4. A noiseless control arrangement for talking machines as claimed in claim 1 comprising a projection secured to the lower part of the motor and a regulating screw movable with reference to the casing and adapted to bear against the said projection and thereby to control the position of the motor.

In testimony whereof I have signed my name to this specification.

MATHIEU DE WRANGEL.